(12) United States Patent
Tacconi et al.

(10) Patent No.: US 8,194,556 B2
(45) Date of Patent: Jun. 5, 2012

(54) LATENCY-AWARE ADAPTIVE BANDWIDTH REQUEST MECHANISM FOR REAL-TIME COMMUNICATION IN WIMAX

(75) Inventors: Pablo Tacconi, Arlington, TX (US); Gregory M. Agami, Arlington Heights, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 870 days.

(21) Appl. No.: 11/953,206

(22) Filed: Dec. 10, 2007

(65) Prior Publication Data

US 2009/0147737 A1    Jun. 11, 2009

(51) Int. Cl.
*H04J 1/16* (2006.01)
*H04L 12/56* (2006.01)
(52) U.S. Cl. ......... 370/252; 370/329; 370/412; 370/477
(58) Field of Classification Search .................. 370/310, 370/252, 329, 412, 477
See application file for complete search history.

(56) References Cited

U.S. PATENT DOCUMENTS

| 2002/0093953 | A1  | 7/2002  | Naim et al. |
| 2005/0281278 | A1  | 12/2005 | Black et al. |
| 2006/0028999 | A1* | 2/2006  | Iakobashvili et al. ........ 370/252 |
| 2007/0076754 | A1  | 4/2007  | Krishnaswamy |
| 2012/0033634 | A1* | 2/2012  | Spinar et al. .................. 370/329 |

FOREIGN PATENT DOCUMENTS

| EP | 1855429 A2    | 11/2007 |
| KR | 1020070061934 A | 6/2007 |

OTHER PUBLICATIONS

Peng, Zhu et al.: "A Novel Bandwidth Scheduling Strategy for IEEE 802.16 Broadband Wireless Networks", In: Wireless Communications, Networking and Mobile Computing, 2007 (WiCom 2007), Sep. 21, 2007, pp. 2000-2003.
Mukul,Retesh et al.: An Adaptive Bandwidth Request Mechanism for QoS Enhancement in WiMax Real Time Communication, Wireless and Optical Communications Networks, 2006 IFIP International Conference, Apr. 11-13, 2006, pp. 1-5.

* cited by examiner

*Primary Examiner* — John Pezzlo

(57) ABSTRACT

A method and apparatus for requesting bandwidth in a subscriber station is disclosed. The method dynamically changes the size of the bandwidth request based on the prediction of the number of packets needed to be transmitted. The average delay experienced by packets in a queue is measured, and this information is then used to change the coefficient of a prediction equation. When the experienced average delay is below the agreed upon QoS latency parameter or delay target, the method reduces the size of the bandwidth requests by making the prediction equation more conservative. On the other hand, when the experienced delay is above the agreed upon latency, the algorithm will make the prediction equation more aggressive, increasing the bandwidth requests and reducing the latency for future packets. By modifying the prediction equation based on the measured delay, the method is able to select the optimal point for achieving time delay requirements while preserving air-link resources.

16 Claims, 7 Drawing Sheets

LATENCY-AWARE ADAPTIVE BANDWIDTH REQUEST MECHANISM FOR REAL-TIME COMMUNICATION IN WIMAX

BACKGROUND OF THE DISCLOSURE

1. Field of the Disclosure

The disclosure relates generally to broadband wireless access communication systems, and more particularly to methodologies in requesting and allocating uplink bandwidth according to qualities of service (QoS) in a broadband wireless access communication system.

2. Introduction

In WiMAX (IEEE 802.16) two principle communication wireless network nodes are defined: the Base Station (BS) and the Subscriber Station (SS). WiMAX offers an open standard and support for quality of service (QoS) for different categories of services. The communication between the BS and SS is through an uplink channel and a downlink channel. The downlink channel is in broadcast mode. Methods of allocating uplink bandwidth in WiMAX differ according to scheduling types based on connections used by the terminals (SS). Extended Real-Time Polling Service (ertPS) is one of the five QoS service types defined in the IEEE 802.16e (WiMax) standard. 802.16e allows several bandwidth requests mechanism including contention-based request from the base station. The 802.16 protocol supports five types of QoS: UGS (Unsolicited grant service), rtPS (Real-time polling service), ertPS (Extended real-time polling service), nrtPS (Non-real-time polling service) and BE (Best effort service). ertPS is a scheduling mechanism that builds on the efficiency of both UGS and rtPS. The ertPS is designed for real-time traffic with variable data rate (such as VoIP service with silence suppression) and uses a bandwidth request-grant scheme to allocate resources for uplink transmissions.

When requesting bandwidth for real-time applications such as VoIP over ertPS, the subscriber station (SS) must do so by predicting the amount of data needed to be transmitted in the future. Asking for too much bandwidth results in poor utilization of the air-link resources, while asking for too little bandwidth results in transmission delays since packets have to wait until the next transmission cycle. An algorithm for predicting the amount of data needed to be transmitted in the future is disclosed in the publication by Mukul et. al., "An Adaptive Bandwidth Request Mechanism for QoS Enhancement in WiMax Real Time Communication", Wireless and Optical Communications Networks, 2006 IFIP International Conference on 11-13 Apr. 2006. The proposed algorithm changes the size of the bandwidth request based on a predictive number of packets awaiting transmission in a queue in order to improve packet delays and buffer requirements at the subscriber station (SS). The Mukul et. al. algorithm, however, achieves latency requirements at the expense of bandwidth utilization, which is the ratio of the bandwidth used and the bandwidth granted, and air-link resources.

For the reasons stated above, and for other reasons stated below which will become apparent to those skilled in the art upon reading and understanding the present specification, there is a need in the art for a mechanism that optimizes air-link resources. There is also a need for an improved mechanism for requesting bandwidth while meeting packet delay requirements in wireless communication systems.

SUMMARY OF THE DISCLOSURE

A method and apparatus for bandwidth requesting in a subscriber station is disclosed. The method dynamically changes the size of the bandwidth request as well as the prediction of the number of packets needed to be transmitted. The average delay experienced by packets in a queue is measured, and this information is then used to change the coefficient of a prediction equation. When the experienced average delay is below the agreed upon QoS latency parameter or delay target, the method reduces the size of the bandwidth requests by making the prediction equation more conservative. On the other hand, when the experienced delay is above the agreed upon latency, the algorithm will make the prediction equation more aggressive, increasing the bandwidth requests and reducing the latency for future packets. By modifying the prediction equation based on the measured delay, the method is able to select the optimal point for achieving time delay requirements while preserving air-link resources.

BRIEF DESCRIPTION OF THE DRAWINGS

In order to describe the manner in which the above-recited and other advantages and features of the disclosure can be obtained, a more particular description of the disclosure briefly described above will be rendered by reference to specific embodiments thereof which are illustrated in the appended drawings. Understanding that these drawings depict only typical embodiments of the disclosure and are not therefore to be considered to be limiting of its scope, the disclosure will be described and explained with additional specificity and detail through the use of the accompanying drawings in which.

DETAILED DESCRIPTION OF THE DISCLOSURE

Additional features and advantages of the disclosure will be set forth in the description which follows, and in part will be obvious from the description, or may be learned by practice of the disclosure. The features and advantages of the disclosure may be realized and obtained by means of the instruments and combinations particularly pointed out in the appended claims. These and other features of the present disclosure will become more fully apparent from the following description and appended claims, or may be learned by the practice of the disclosure as set forth herein.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosure comprises a variety of embodiments, such as a method and apparatus and other embodiments that relate to the basic concepts of the disclosure.

The invention concerns the exchange of packets in a broadband wireless metropolitan area networks (WMANs) using the IEEE 802.16 standard commonly known as WiMax, the invention is not limited thereto and can be applied to other types of wireless networks where similar advantages may be obtained. The following inventive embodiments may be used in a variety of applications including transmitters and receivers of a radio system, although the present invention is not limited in this respect. Radio systems specifically included within the scope of the present invention include, but are not limited to, network interface cards (NICs), network adaptors, fixed user stations, mobile stations, base stations, access points (APs), hybrid coordinators (HCs), gateways, bridges, hubs, routers and other network peripherals. Further, the radio systems within the scope of the invention may include cellular radio telephone systems, satellite systems, personal communication systems (PCS), two-way radio systems and two-way pagers as well as computing devices such as personal computers (PCs) and related peripherals, personal digital assistants (PDAs), personal computing accessories, handheld communication devices and all existing and future arising systems which may be related in nature and to which the principles of the inventive embodiments could be suitably applied. The subscriber station of a wireless communication system can traffic data within different regions of the network.

Figure 1:
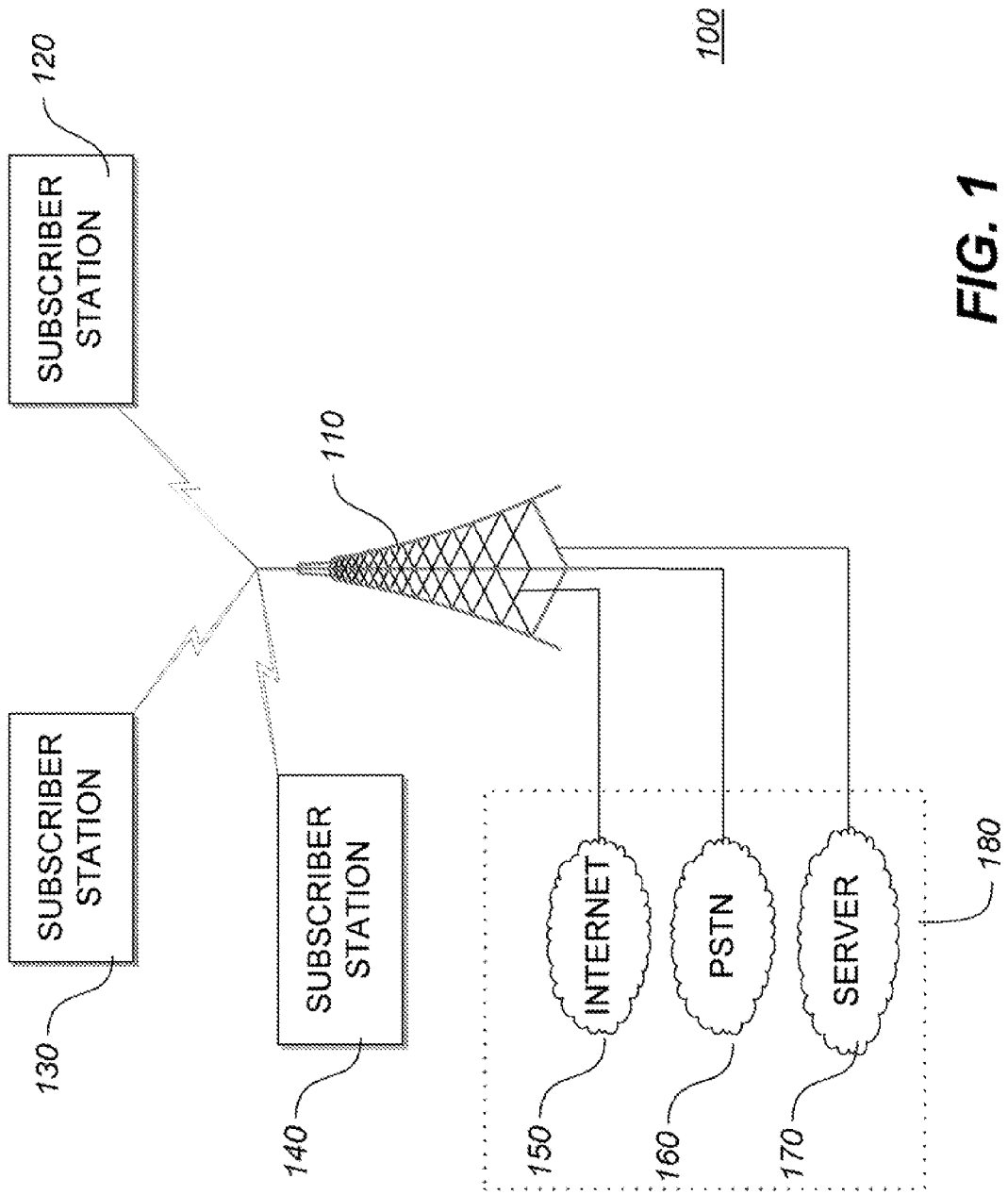
FIG. 1 is an exemplary diagram of a wireless network in accordance with a possible embodiment of the disclosure.

FIG. 1 is an illustration of a wireless communication network 100 according to various inventive embodiments may be any wireless system capable of facilitating wireless access between a provider network 180 such as internet network 150, public switch telephone network 160, and server 170 and one or more subscriber stations 120, 130, 140 including mobile subscribers. For example in one embodiment, network 100 may be a wireless broadband network such as those contemplated by various 802.16 standards specified by the Institute of Electrical and Electronics Engineers (IEEE) for fixed and/or mobile subscribers, although the inventive embodiments are not limited in this respect. In the IEEE 802.16 standards the broadband wireless networks (referred to as WiMax, an acronym that stands for Worldwide Interoperability for Microwave Access, which is a certification mark for products that pass conformity and interoperability tests for IEEE 802.16 standards), two principle communicating wireless network nodes are defined: the Base Station (BS) 110 and the Subscriber Station (SS) (e.g., subscriber stations 120, 130, 140).

Base station 110 is a managing entity which controls the wireless communication between subscriber stations 120-140 and provider network 180. Subscriber stations 120-140 in turn, may facilitate various service connections of other devices (not shown) to provider network 180 via a private or public local area network (LAN), although the embodiments are not limited in this respect.

In one implementation, base station 110 sends data to subscriber stations 120-140 in downlink (DL) and receives data from subscriber stations 120-140 in uplink (UL) in the form of radio frames. In one example embodiment, uplink and downlink communications are maintained by sending radio frames at constant, but configurable intervals. One notable feature of these types of networks is that a single radio frame may consist of data destined to, or originating from, multiple subscriber stations. As an example, subscriber station 120 may service multiple connections for other devices of local area network all within individual UL and DL radio frames.

Bandwidth in a radio link is often limited and thus, base station 110, as the managing entity, may control bandwidth utilization. For example, in downlink, base station 110 may analyze the amount of traffic incoming from provider network 180 and schedule it for transmission to destination subscriber stations, preferably in a fair and efficient manner. Managing base station 110 may also grant bandwidth to subscriber stations 120-140 for use in the uplink direction. In one example configuration, uplink bandwidth is allocated per frame as a part of the UL or DL radio frame which can be used by a certain SS. If an SS has data to transmit in UL, it may explicitly requests UL bandwidth from the BS 110 by specifying a transmit buffer occupancy for each connection it services.

Figure 2:
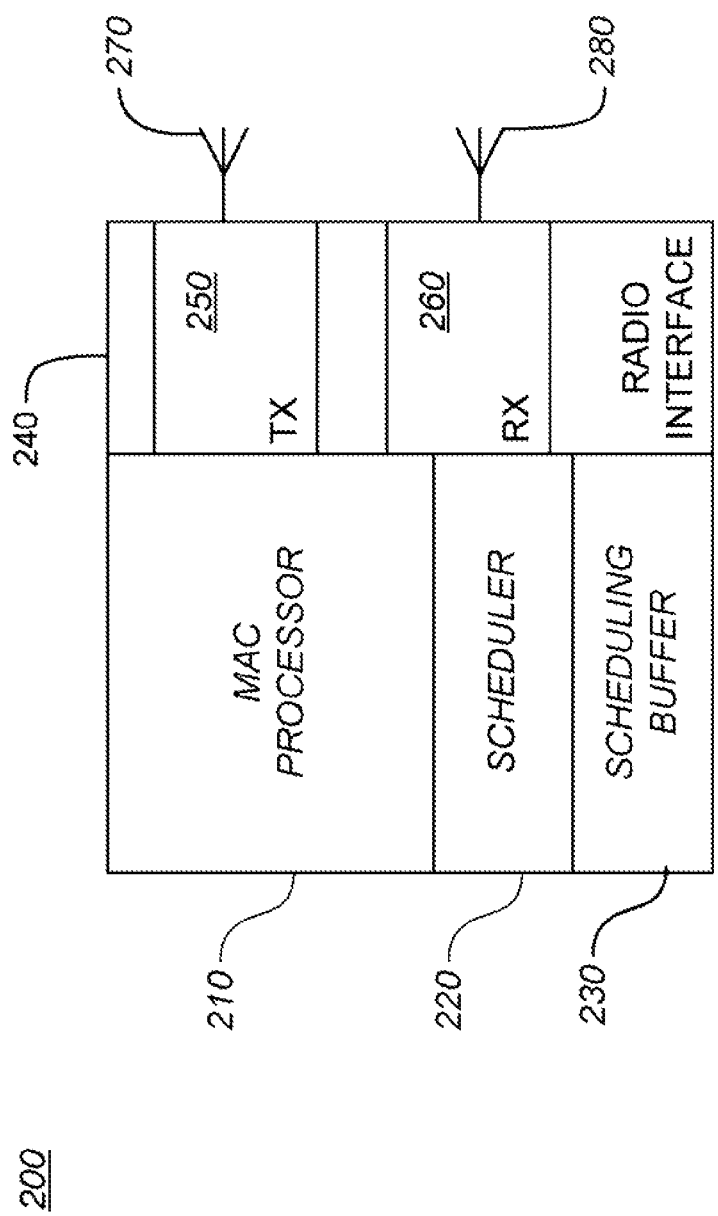
FIG. 2 is a diagram of a subscriber station in accordance with a possible embodiment of the disclosure.

FIG. 2 is an illustration a subscriber station 200 or mobile station for use in a wireless network comprising a processing circuit including logic such as circuitry, processor and software, or combination thereof to schedule uplink traffic for more than one active connection as described in one or more of the processes above. In certain embodiments, subscriber station 200 may generally include a radio frequency (RF) interface 240 and a medium access controller (MAC) processor 210. As a general matter, a subscriber station 200 comprises a transceiver capable of transmitting packets to a base station, a processor capable of determining packet latency from previous transmission, and a controller capable of adjusting the size of the bandwidth request based on the determined packet latency. Additionally, a scheduler capable of requesting from the base station the adjusted bandwidth request may be included in subscriber station 200.

In one example embodiment, RF interface 240 may be any component or combination of components adapted to send and receive multi-carrier modulated signals such as OFDM, although the inventive embodiments are not limited to any specific over-the-air interface or modulation scheme. RF interface 240 may include, for example, a receiver 260, a transmitter 250, and frequency synthesizer (not shown). RF interface 240 may also include bias controls, a crystal oscillator and/or one or more antennas 270, 280 if desired. Furthermore, RF interface 240 may alternatively or additionally use external voltage-controlled oscillators (VCOs), surface acoustic wave filters, intermediate frequency (IF) filters and/or radio frequency (RF) filters as desired. Various RF interface designs and their operation are known in the art and the description thereof is therefore omitted. In some embodiments RF interface 240 may be configured to be compatible with one or more of the IEEE 802.16 standards contemplated for broadband wireless networks, although the embodiments are not limited in this respect.

MAC processor 210 may communicate with RF interface 240 to process receive/transmit signals and may include, by way of example only, an analog-to-digital converter for down converting received signals, a digital-to-analog converter for up converting signals for transmission, and optionally, a baseband processor for physical (PHY) link layer processing of respective receive/transmit signals. MAC processor 210 performs medium access control and data link layer processing.

In certain embodiments of the present invention, MAC processor 210 may include an uplink scheduler 220, in combination with additional circuitry such as buffer memory scheduling buffer 230, which may function to queue, dequeue or otherwise schedule MAC Source Data Units (SDUs) for uplink transmission to base station 110.

MAC Processor 210 may include at least one conventional processor or microprocessor that interprets and executes instructions from a memory. A Memory may be a random access memory (RAM) or another type of dynamic storage device that stores information and instructions for execution by MAC processor 210. Alternatively, MAC processor may include article of manufacture comprising a tangible medium having machine readable instructions stored thereon, the machine readable instructions when executed by a processing platform (MAC processor 210) results in transmitting packets to a base station, determining packet latency from previous transmissions, adjusting the bandwidth request based on the determined packet latency, and requesting from the base station the adjusted bandwidth request. In varying embodiments, a memory is a magnetic medium, an electronic medium, or an optical medium. A memory may also include a read-only memory (ROM) which may include a conventional ROM device or another type of static storage device that stores static information and instructions for MAC processor 210. The executable instructions are capable of directing MAC processor 210 to perform selecting, requesting at least one of a bandwidth higher than the agreed upon bandwidth request, a bandwidth lower than the agreed upon bandwidth request, or the agreed upon bandwidth request. The request is based on packets at the subscriber station that need transmission to the base station or based on packets at the subscriber station at the time of the bandwidth request and a prediction of the packets that will arrive before the bandwidth grant is received.

Apparatus 200 may be, for example, a wireless mobile station, wireless router or NIC and/or network adaptor for computing devices. Accordingly, the previously described functions and/or specific configurations of apparatus 200 could be included or omitted as suitably desired.

Embodiments of apparatus 200 may be implemented using single input single output (SISO) architectures. However, as shown in FIG. 2, certain preferred implementations may use multiple input multiple output (MIMO) architectures having multiple antennas (e.g., 270, 280) for transmission and/or reception. Further, embodiments of the invention may utilize multi-carrier code division multiplexing (MC-CDMA) multi-carrier direct sequence code division multiplexing (MC-DS-CDMA) for over-the-air (OTA) link access or any other existing or future arising modulation or multiplexing scheme compatible with the features of the inventive embodiments.

The components and features of subscriber station 200 may be implemented using any combination of discrete circuitry, application specific integrated circuits (ASICs), logic gates and/or single chip architectures. Further, the features of apparatus 200 may be implemented using microcontrollers, programmable logic arrays and/or microprocessors or any combination of the foregoing where suitably appropriate (collectively or individually referred to as "logic" or "circuit"). It should be appreciated that the example subscriber station 200 shown in the block diagram of FIG. 2 represents only one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments of the present invention. Unless contrary to physical possibility, the inventors envision the methods described herein: (i) may be performed in any sequence and/or in any combination; and (ii) the components of respective embodiments may be combined in any manner.

Figure 3:
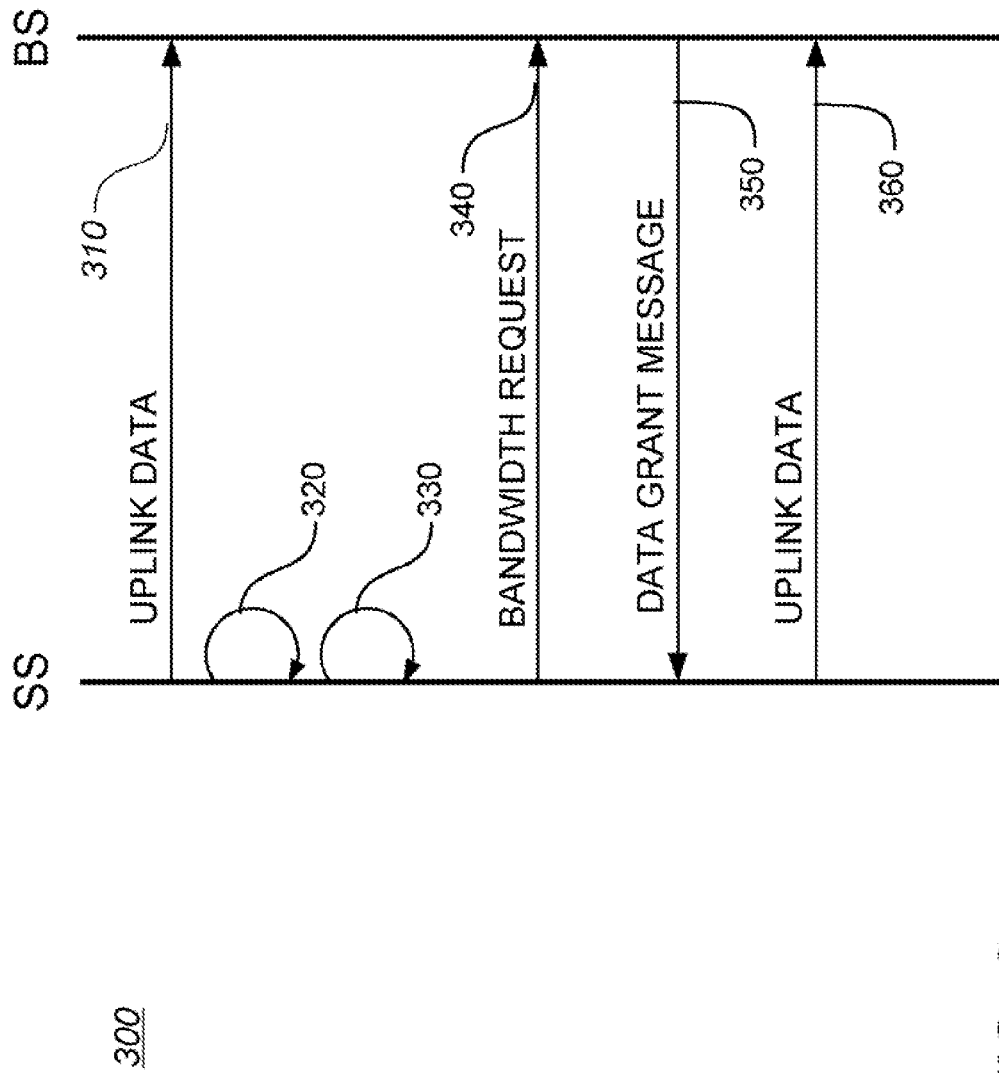
FIG. 3 is an exemplary diagram of messages exchanged between a subscriber station and a base station in the wireless network in accordance with a possible embodiment of the disclosure.

FIG. 3 illustrates process 300 for exchanging messages between the base station (BS) 110 and the subscriber station (SS) such as station 120-140 in wireless communication system 100 according to the present invention. Each subscriber station (SS) has a transceiver capable of transmitting packets to a base station (BS) at a previous bandwidth grant, a circuit or processor capable of determining packet latency from the transmission at the previous bandwidth grant, controller capable of adjusting the bandwidth request based on the determined packet latency, and a scheduler capable of requesting from the base station the adjusted bandwidth request. From the SS point of view, requesting is at least one of a bandwidth higher than the previous bandwidth request, a bandwidth lower than the previous bandwidth request, or the previous bandwidth request.

In step 310, the subscriber station (SS) 120 begins transmitting packets to a base station (BS) 110 at an agreed upon bandwidth. The bandwidth request is based on packets at the subscriber station (SS) that need transmission to the base station. In the alternative, bandwidth request is based on packets at the subscriber station at the time of the bandwidth request and a prediction of the packets that will arrive before the bandwidth grant is received. In step 320 the subscriber station 120 starts determining packet latency from the transmission at the agreed upon bandwidth between SS and BS. The determination is a measure of how long the packets were waiting in the queue before they left the queue. A packet is assigned a time stamp when it enters the queue and then the time stamp is read when the packet exits the queue. As a general matter, packet latency is an average of packet delay experienced by the packets at the subscriber station. IEEE 802.16 defines key QoS metrics or a QoS parameter set associated with the different scheduling services. Examples of the QoS parameter set are: the maximum sustained rate (MSR), minimum reserved rate (MRR), maximum latency, maximum jitter and priority. The MRR is associated with different scheduling services, acting as the "guarantee", while the MSR serves to rate limit a connection or "enforcement" of a maximum sustained rate. The maximum latency is a target transmission delay that on the average the wireless communication system should ascertain.

In step 330 the subscriber station starts adjusting based on the determined packet latency the agreed upon bandwidth (the size of the unsolicited grant for ertPS connections). The adjusting is based on how far from the target transmission delay the subscriber station is currently operating. Further, the adjusting is based on a target transmission delay and the determined packet latency or the adjusting is proportional to a difference between the target transmission delay and the determined packet latency. If the subscriber station is surpassing the target transmission delay, that the average packet latency is below the QoS maximum latency allocation for the SS, then the wireless system can afford to lower the bandwidth requirement. The bandwidth requirement for the next transmission should be set at a lower amount. The lower amount can be made proportional, exponential, or simply by asking for a lower percentage than the previous bandwidth request.

In step 340, the SS sends a bandwidth request to the BS based on the adjustment made in step 330. Then, the subscriber station (SS) analyzes the uplink mobile application part (UL-MAP) for an opportunity to send a bandwidth request, via one of the allowable mechanism specified in 802.16e. The typical bandwidth request message includes the ID information of the subscriber station (SS) and the bandwidth size to be requested. The serving base station (BS) receives the bandwidth request and schedules an uplink bandwidth transmission for the SS. In step 350, the base station transmits a UP-MAP containing the data grant for the SS, specifying the bandwidth size. The bandwidth size from the base station, once received by the subscriber station, becomes the agreed upon unsolicited grant. It should be noted at this point that the size of the bandwidth request from the SS need not be the same size as the granted bandwidth size from the BS. The SS in step 360 uses the granted bandwidth size from the BS to transmit data.

Figure 4:
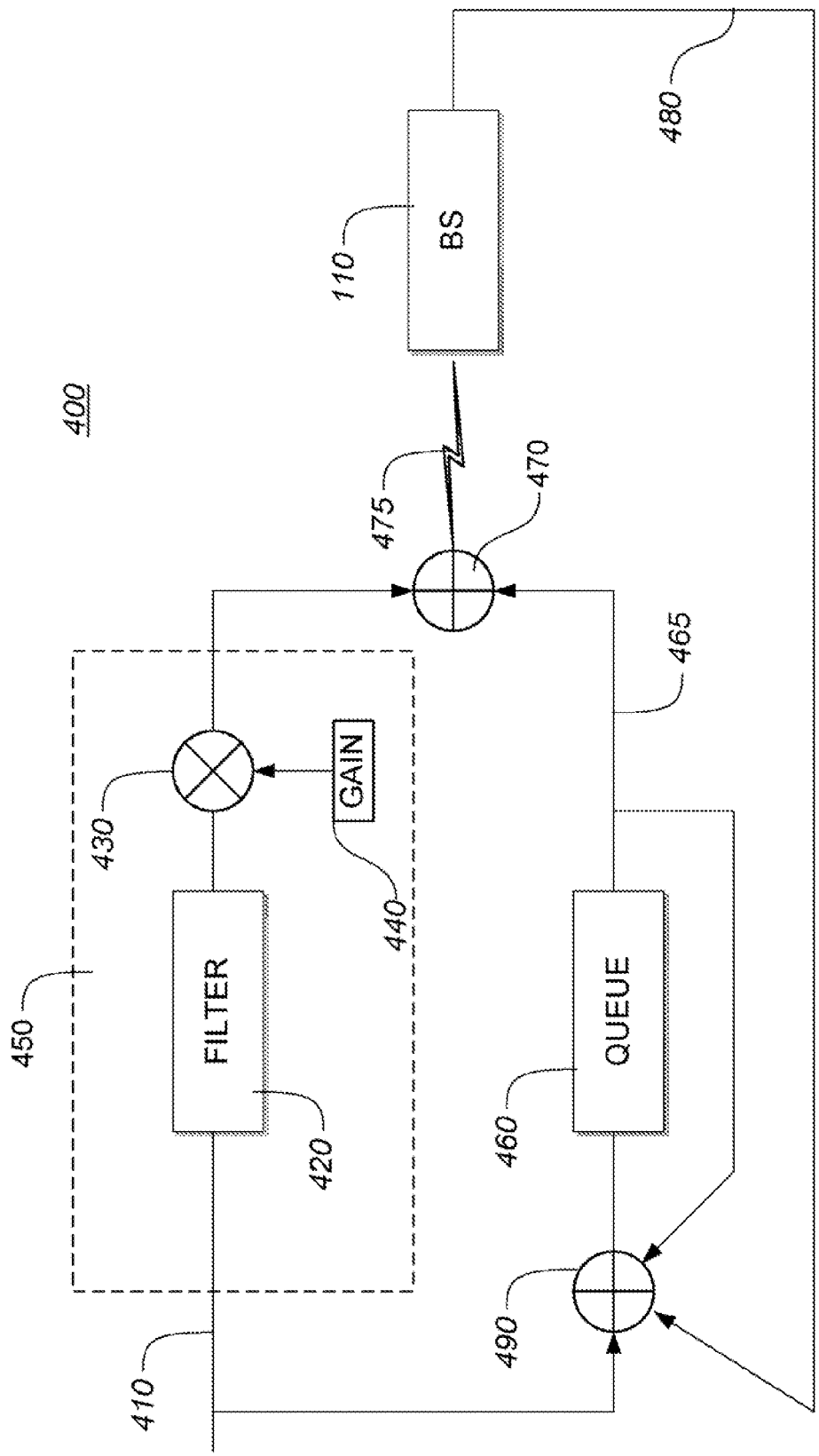
FIG. 4 is an exemplary diagram of a latency-aware adaptive bandwidth request mechanism in accordance with a possible embodiment of the disclosure.

FIG. 4 is an exemplary diagram of a latency-aware adaptive bandwidth request mechanism in accordance with a possible embodiment of the disclosure. In FIG. 4 scheduler 400 implements a latency-aware adaptive bandwidth request algorithm in circuit form. Scheduler 400 employs a filter 420, a multiplier 430, a first adder 490, a second adder 470, and a gain generator 440 for dynamically changing a bandwidth request. The proposed algorithm dynamically changes the size of the bandwidth request based on a combination of the number of packets already present in the queue, the number of packets predicted to arrive into the queue by the time of the grant arrival, adjusted by the difference between the measured average delay and the target delay. Scheduler 400 solves the need in the art for preserving uplink resources and maintaining acceptable transmission delays. Under-prediction results in larger latencies. Over-prediction results in waste of all or a portion of the requested bandwidth. As the prediction is made more aggressive, the latency decreases, but the utilization decreases causing more air-link bandwidth to be requested, wasting bandwidth. The scheduler 400 attempts to find the ideal set point in the latency versus bandwidth utilization curve. The scheduler changes the coefficients or coefficient of a prediction equation according to the difference between the measured delay and the target latency. The scheduler 400 then achieves an average delay equal to the committed latency while minimizing the requested the air-link resources (maximizing utilization).

Packets enter an ertPS queue at a discernable arrival rate (Narrival (fn)) at line 410. Where fn is the radio frame number usually about 5 ms. A prediction circuit 450 predicts the rate of arrival into the queue. A moving average filter 420 is used to average the packet arrivals into the ertPS queue. The output of moving average filter is multiplied by gain 440 (Gain (fn)) at multiplier 430. The output of prediction circuit 450 is use to make a prediction of the packets that will arrive before the bandwidth request is granted by the base station. The predictive packet arrival rate is then summed with the length of queue 460 (Nqmsgs (fn) 465) at summer 470 to produce the bandwidth request size (BRsize(fn) 475). The base station 110 will answer the bandwidth request with a bandwidth grant 480. The bandwidth grant is used to empty queue 460, and is represented by UGsize (fn). The packet arrival rate 410 and the number of packets in queue 460 are subtracted from bandwidth grant 480 at summer 490. The bandwidth request can be represented mathematically as:

$$BRsize(f_N) = Nqmsgs(f_N) + Narrival(f_N) \times Gain(f_N) \quad \text{EQ. 1}$$

Figure 5:
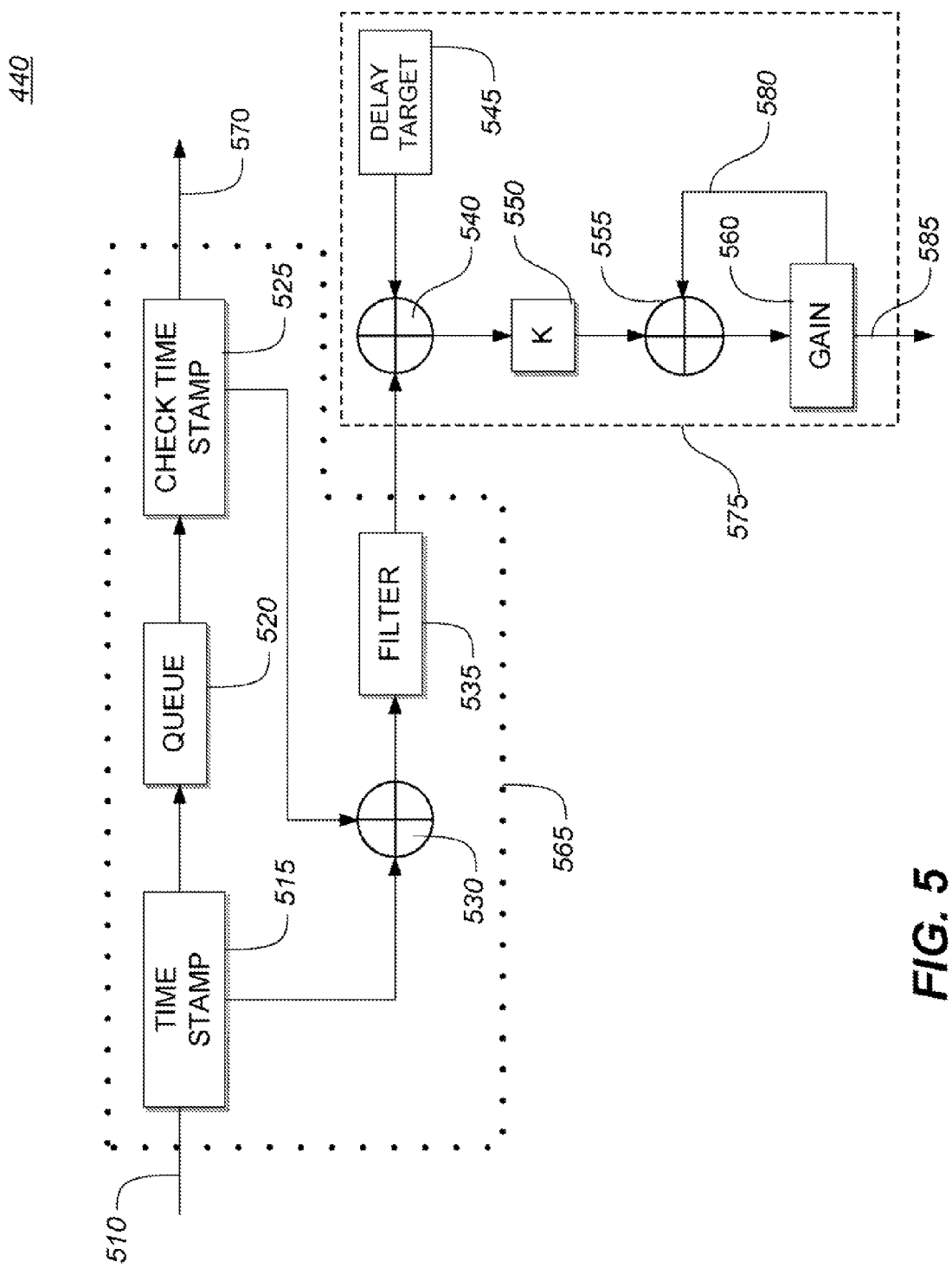
FIG. 5 is an exemplary diagram of an adaptive mechanism in accordance with a possible embodiment of the disclosure.

FIG. 5 is an illustration of gain 440 for dynamically changing a bandwidth request. Packets enter a processor 565 through line 510. Processor 565 is capable of determining packet latency from the transmission at a previous bandwidth grant. Packet latency is determined by processor 565 through a process of stamping incoming traffic and averaging. Traffic entering transmission queue 520 are assigned a time stamp 515. The time stamp is checked by check time stamp circuit 525 when the traffic is exiting the transmission queue at line 570. The difference between the time stamp 515 and the check time stamp 525 is determined by adder 530. The difference is the packet queuing delay, Delay(fn). The delay is averaged at filter 535, this average is the average delay or packet latency for the transmission. The average delay is forwarded to controller 575 for further processing. Controller 575 is capable of adjusting based on the determined packet latency the bandwidth request. The average delay from filter 535 is then subtracted from a target delay (TD) 545 at summer 540. As noted earlier QoS maximum latency allocation for the SS can be set as the delay target. It should be noted that delay target could be any arbitrary value. The output of summer 540 is the difference between the average delay and the delay target set for the particular subscriber station. The difference is multiplied by a factor K 550 and processed through a feedback loop consisting of adder 555, gain 560, and feedback 580. A gain, Gain (fn), that can be used to change the bandwidth request is produced at output line 585. The gain can be described mathematically as follow:

$$Gain(fn) = Gain(fn-1) + K^*(Delay(fn) - TD) \quad \text{EQ. 2}$$

$$BRsize(fn) = Nqmsgs(fn) + Narrival(fn)^* Gain(fn) \quad \text{EQ. 3}$$

As can be seen from equation 3, the bandwidth size can be increased or decreased based on packet latency and the target transmission delay. The average delay experienced by the packets in the queue is measured, and this information is then used to change the coefficient of the prediction equation. When the experienced average delay is below the agreed upon QoS latency parameter (target delay), the algorithm will reduce the size of the bandwidth requests by making the prediction equation more conservative. On the other hand, when the experienced delay is above the agreed upon latency (target delay), the algorithm will make the prediction equation more aggressive, increasing the bandwidth requests and reducing the latency for future packets. By modifying the prediction equation based on the measured delay, the algorithm is able to select the optimal point of operation in the delay and utilization curve.

Figure 6:
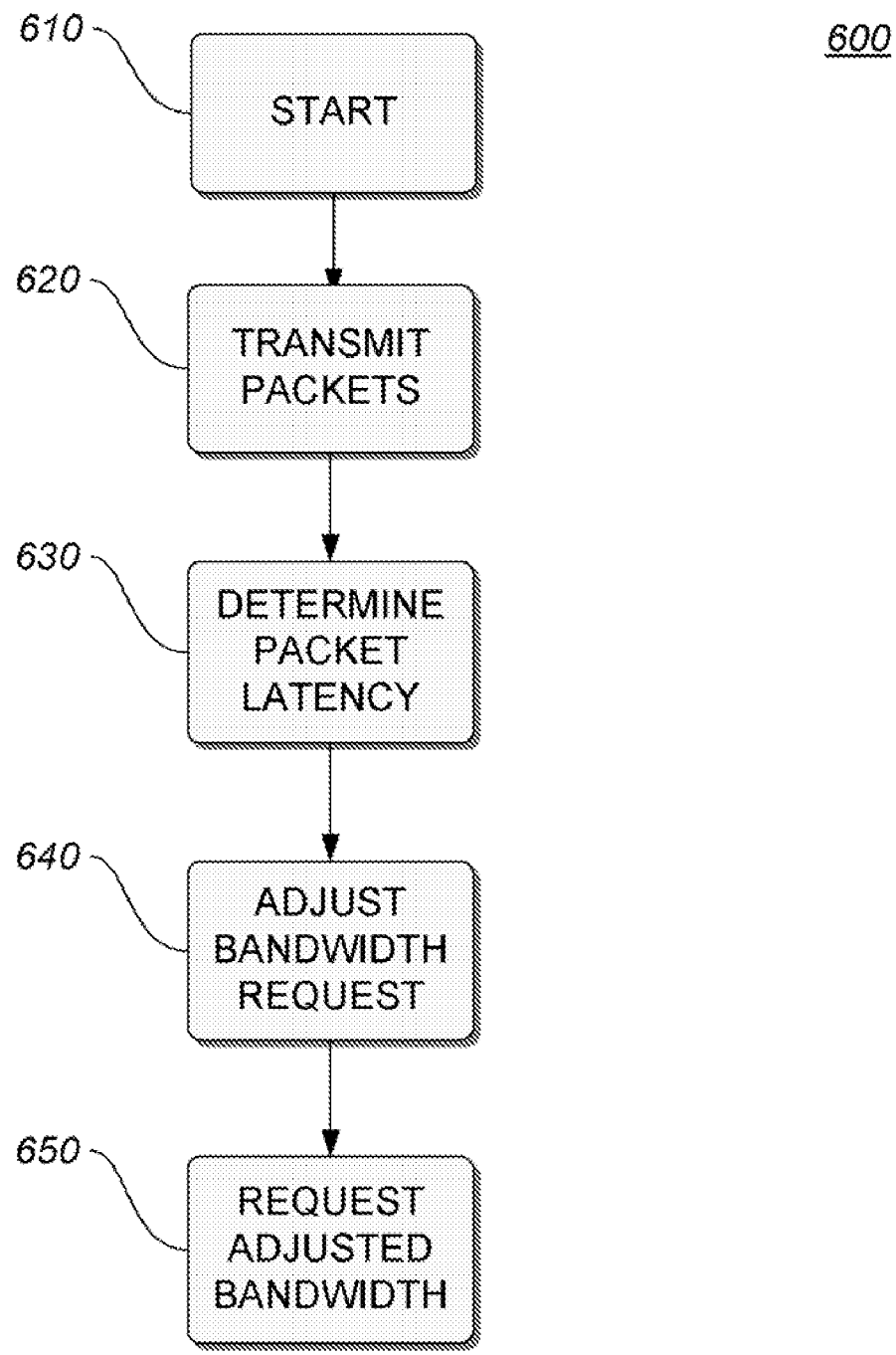
FIG. 6 is a flowchart illustrating an exemplary bandwidth request process in accordance with a possible embodiment of the invention.

FIG. 6 is an illustration of a process or method 600 for bandwidth request in a subscriber station. Method 600 comprises transmitting packets to a base station at a rate agreed upon by a bandwidth request-grant mechanism, determining packet latency from the transmission, and adjusting the size of the bandwidth request based on the determined packet latency. Method 600 after the adjusting starts requesting from the base station the adjusted bandwidth request. The method begins at step 610 when the process is started. Control is then pass to step 620 by transmitting packets to a base station at an agreed upon bandwidth. After the transmission of the packets, step 630 performs a packet latency analyses by determining packet latency from the previous transmission. Further, the determined packet latency is subtracted from a target delay and this difference is submitted to step 640 so as to make adjustments to the next request for bandwidth adjustment. In step 650, the subscriber station makes a request for the adjusted bandwidth. Process 600 is repeated for each packet transmission.

Figure 7:
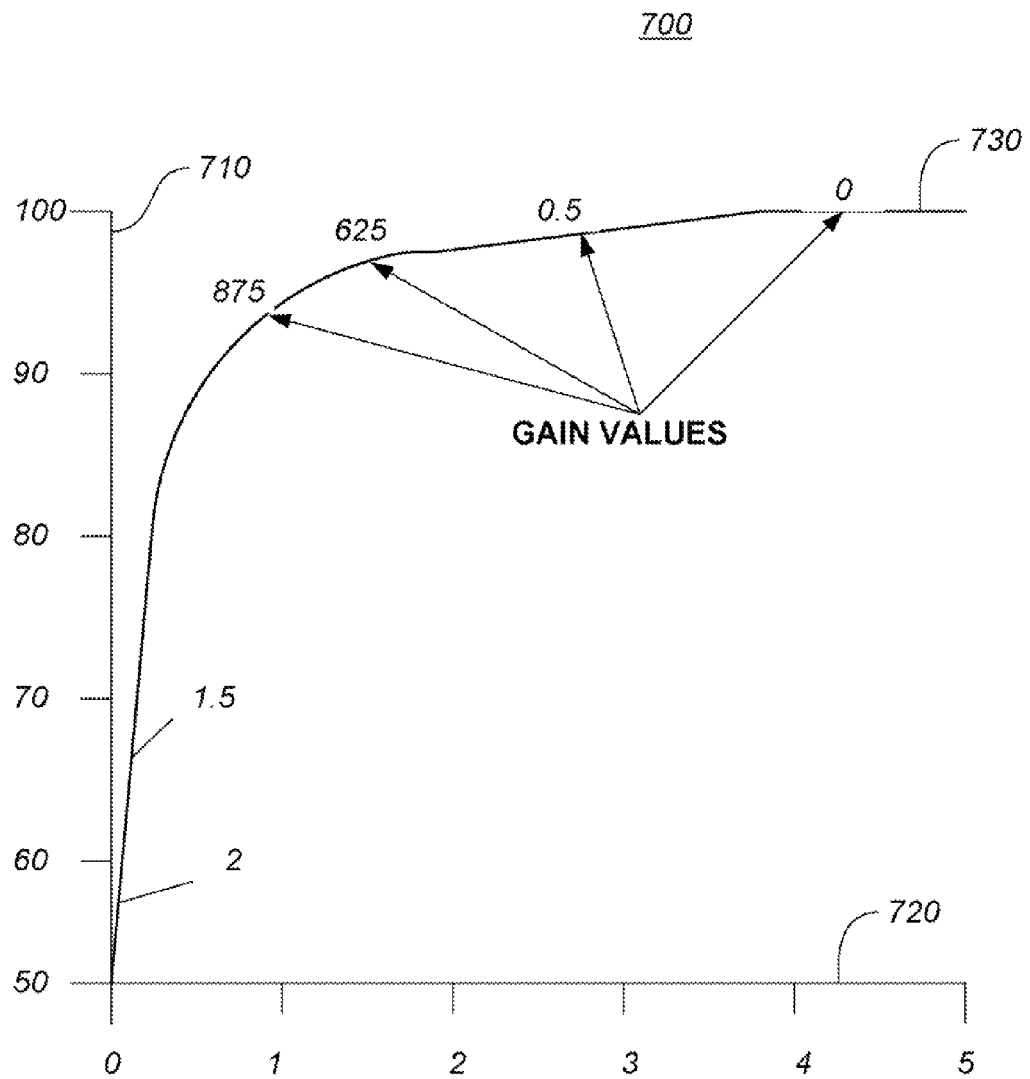
FIG. 7 is an illustration of bandwidth utilization and average delay in accordance with a possible embodiment of the invention.

FIG. 7 is an illustration of diagram 700 showing bandwidth utilization versus average delay curve 730 as a function of gain values. The diagram assumes that the base station will grant (BWgranted) the bandwidth requested (BWrequested) by the subscriber station. The bandwidth utilization 710 (BWutilization) is a measure of what percentage of the granted bandwidth is used by the subscriber station, where BWused is the amount of bandwidth used (filled with VoIP data). When the predictive gain is set to zero (0), the algorithm becomes reactive; there is no prediction, and therefore it only makes bandwidth requests for data present in the queue, yielding a 100% bandwidth utilization. Since there is bound to be some traffic arriving after the request is made, there will be a time delay for those arriving packets. A bandwidth utilization of 50% means than only half of the requested and granted bandwidth was filled with data. A 50% bandwidth utilization also means that the SS is using twice as much air-link bandwidth than it would have used in reactive mode. The Average Delay 720 is the average amount of time a packet spends between entering the ertPS queue and leaving it. The gain values (different points) in the curve were obtained by setting the predictive gain coefficient to a fixed value. Clearly, the average delay of the VoIP packet can be reduced significantly by using a predictive bandwidth request mechanism. However, the airlink usage (defined as the inverse of bandwidth utilization) increases as well. Therefore, setting the proper amount of prediction is critical to minimize airlink usage (maximizing utilization). The latency-aware algorithm will automatically calculate the proper predictive gain coefficient to ensure the VoIP packets experience the desired delay without wasting any unnecessary air-link bandwidth.

Although the above description may contain specific details, they should not be construed as limiting the claims in any way. Other configurations of the described embodiments of the disclosure are part of the scope of this disclosure. For example, the principles of the disclosure may be applied to each individual user where each user may individually deploy such a system. This enables each user to utilize the benefits of the disclosure even if any one of the large number of possible applications do not need the functionality described herein. It does not necessarily need to be one system used by all end users. Accordingly, the appended claims and their legal equivalents should only define the disclosure, rather than any specific examples given.

We claim:

1. A method for bandwidth request in a subscriber station comprising:
    transmitting packets to a base station at a rate agreed upon by a bandwidth request-grant mechanism;
    determining packet latency from the transmission; and
    adjusting the size of a bandwidth request based on a difference between the determined packet latency and a target transmission delay, a number of packets in a transmission queue of the subscriber station at the time of the bandwidth request adjusting the size of the bandwidth request and a prediction of a number packets in the transmission queue of the subscriber station that will arrive before the bandwidth grant is received by the base station.

2. The method of claim 1, the method further comprising: requesting from the base station the adjusted bandwidth request.

3. The method of claim 2, wherein requesting is at least one of a bandwidth higher than the agreed upon bandwidth request, a bandwidth lower than the agreed upon bandwidth request, or the agreed upon bandwidth request.

4. The method of claim 1, wherein the packet arrival prediction is adjusted based on packet latency.

5. The method of claim 4, wherein packet latency is the average of the packet delay experienced by the packets at the subscriber station.

6. The method of claim 5, wherein adjusting is proportional to a difference between the target transmission delay and the determined packet latency.

7. A subscriber station of a wireless communication system, comprising:
    a transceiver capable of transmitting packets to a base station;
    a processor capable of determining packet latency from previous transmission; and
    controller capable of adjusting the size of a bandwidth request based on a difference between the determined packet latency and a target transmission delay, a number of packets in a transmission queue of the subscriber station at the time of the bandwidth request adjusting the size of the bandwidth request and a prediction of a number packets in the transmission queue of the subscriber station that will arrive before the bandwidth grant is received by the base station.

8. The subscriber station of claim 7, the subscriber station further comprising:
    a scheduler capable of requesting from the base station the adjusted bandwidth request.

9. The subscriber station of claim 8, wherein adjusting is at least one of requesting a bandwidth higher than the previous bandwidth request, requesting a bandwidth lower than the previous bandwidth request, or requesting the previous bandwidth request.

10. The subscriber station of claim 7, wherein the packet arrival prediction is adjusted based on packet latency.

11. The subscriber station of claim 10, wherein packet latency is the average of the packet delay experienced by the packets at the subscriber station.

12. The subscriber station of claim 11, wherein adjusting is proportional to a difference between the target transmission delay and the determined packet latency.

13. An article of manufacture comprising a non-transitory tangible medium having machine readable instructions stored thereon, the machine readable instructions when executed by a processing platform comprising:
    transmitting packets to a base station;
    determining packet latency from previous packet transmission;
    adjusting the size of the bandwidth request based on a difference between the determined packet latency and a target transmission delay, a number of packets in a transmission queue of the subscriber station at the time of the bandwidth request adjusting the size of the bandwidth request and a prediction of a number packets in the transmission queue of the subscriber station that will arrive before the bandwidth grant is received by the base station; and
    requesting the adjusted bandwidth request from the base station.

14. The article of claim 13, wherein requesting is at least one of a bandwidth higher than the agreed upon bandwidth request, a bandwidth lower than the agreed upon bandwidth request, or the agreed upon bandwidth request.

15. The article of claim 14,
    wherein the packet arrival prediction is adjusted based on packet latency;
    wherein packet latency is an average of packet delay experienced by the packets at the subscriber station.

16. The article of claim 15, wherein adjusting is proportional to a difference between the target transmission delay and the determined packet latency.

* * * * *